United States Patent [19]
Dykema

[11] Patent Number: 5,442,340
[45] Date of Patent: Aug. 15, 1995

[54] TRAINABLE RF TRANSMITTER INCLUDING ATTENUATION CONTROL

[75] Inventor: Kurt A. Dykema, Holland, Mich.

[73] Assignee: Prince Corporation, Holland, Mich.

[21] Appl. No.: 55,509

[22] Filed: Apr. 30, 1993

Related U.S. Application Data

[63] Continuation-in-part of Ser. No. 874,361, Apr. 24, 1992, abandoned, which is a continuation-in-part of Ser. No. 567,390, Aug. 14, 1990, which is a continuation-in-part of Ser. No. 279,643, Dec. 5, 1988, abandoned.

[51] Int. Cl.$^6$ ............................................. H04Q 7/02
[52] U.S. Cl. ............................ 340/825.22; 340/825.69; 341/176
[58] Field of Search ................ 340/825.22, 825.69, 340/825.71, 825.72, 825.31, 825.57; 341/176; 359/148; 455/161.2, 161.1, 71, 86, 126; 370/29

[56] References Cited

U.S. PATENT DOCUMENTS

| | | | |
|---|---|---|---|
| Re. 29,525 | 1/1978 | Willmott | 375/23 |
| 4,178,549 | 12/1979 | Lendenbach et al. | 375/22 |
| 4,241,870 | 12/1980 | Marcus | 296/37.7 |
| 4,247,850 | 1/1981 | Marcus | 340/825.69 |
| 4,385,296 | 5/1983 | Tsubaki et al. | 340/825.72 |
| 4,447,808 | 5/1984 | Marcus | 341/176 |
| 4,482,947 | 11/1984 | Zato et al. | 364/138 |
| 4,509,093 | 4/1985 | Stellberger | 361/172 |
| 4,529,980 | 7/1985 | Liotine et al. | 340/825.52 |
| 4,535,333 | 8/1985 | Twardowski | 340/825.69 |
| 4,550,311 | 10/1985 | Galloway et al. | 340/531 |
| 4,573,046 | 1/1986 | Pinnow | 340/825.56 |
| 4,595,228 | 6/1986 | Chu | 296/37.7 |
| 4,596,985 | 6/1986 | Bongard et al. | 340/825.69 |
| 4,623,887 | 11/1986 | Welles, II | 340/825.57 |
| 4,626,848 | 12/1986 | Ehlers | 340/825.69 |
| 4,652,860 | 3/1987 | Weishaupt et al. | 340/539 |
| 4,665,397 | 5/1987 | Pinnow | 340/825.56 |
| 4,703,359 | 10/1987 | Rumbolt et al. | 348/734 |
| 4,750,118 | 6/1988 | Heitschel et al. | 364/408 |
| 4,771,283 | 9/1988 | Imoto | 340/825.71 |
| 4,866,434 | 9/1989 | Keenan | 340/825.72 |
| 4,878,052 | 10/1989 | Schulze | 340/825.69 |
| 4,881,148 | 11/1989 | Lambropoulos et al. | 361/172 |
| 4,912,463 | 3/1990 | Li | 340/825.69 |
| 4,988,992 | 1/1991 | Heitschel et al. | 340/825.69 |
| 5,123,008 | 6/1992 | Beesley | 370/29 |
| 5,126,686 | 6/1992 | Tam | 455/126 |

Primary Examiner—Donald J. Yusko
Assistant Examiner—Edwin C. Holloway, III
Attorney, Agent, or Firm—Price, Heneveld, Cooper, DeWitt & Litton

[57] ABSTRACT

A transmitter includes an attenuator for adjusting the level of an output signal as a function of the pulse width and frequency of the output signal. The transmitter also includes receiver components which are disabled when the transmitter is transmitting.

26 Claims, 8 Drawing Sheets

1

TRAINABLE RF TRANSMITTER INCLUDING ATTENUATION CONTROL

RELATED APPLICATIONS

This application is a continuation-in-part of U.S. patent application Ser. No. 07/874,361, entitled VEHICLE ACCESSORY TRAINABLE TRANSMITTER, filed on Apr. 24, 1992, now abandoned, which is a continuation-in-part of application Ser. No. 07/567,390, filed Aug. 14, 1990 entitled ELECTRICAL CONTROL SYSTEM FOR VEHICLE OPTIONS, which is a continuation-in-part of application Ser. No. 07/279,643, filed Dec. 5, 1988, and entitled MIRROR COMPASS, now abandoned, the disclosures of which are incorporated herein by reference.

BACKGROUND OF THE INVENTION

This application pertains to radio frequency transmitters and more particularly to a trainable radio frequency transceiver for remotely controlling one or more devices.

A trainable transmitter for remotely actuating a garage door opening mechanism is disclosed in U.S. patent application No. 07/567,390, filed Aug. 14, 1990, and entitled ELECTRICAL CONTROL SYSTEM FOR VEHICLE OPTIONS. This trainable transmitter learns radio frequency control signals of the type used to remotely actuate devices, such as garage door opening mechanisms used in the United States. In a learning mode, the transceiver identifies the carrier frequency and code of a control signal transmitted by a radio frequency remote control. In a transmitting mode, the transmitter emits a control signal having the carrier frequency and the code of the learned signal.

An improved trainable transmitter having additional advantages and characteristics was developed from the transmitter disclosed in application 07/567,390, and is the subject matter of United States patent application 07/874,361, entitled VEHICLE ACCESSORY TRAINABLE TRANSMITTER filed on Apr. 24, 1992. The improved transmitter includes novel amplitude control, signal identification techniques, and signal storage techniques.

Although these transmitters provide novel, versatile trainable transmitters, it remains desirable to provide additional improvements in the operating characteristics of the transmitter. One difficulty is the trainable transmitter includes receiver components for inputting the control signals in the training mode which introduce noise into the output signal in the transmission mode. An additional difficulty is providing a gain control for adjusting the output level of the transmitter such that it complies with the FCC requirements over the entire frequency range of the transmitter and effectively compensates for inherent variations in the signal strength of the transmitter at different frequencies.

SUMMARY OF THE INVENTION

The system of the present invention provides an improved radio frequency transmitter. According to one aspect of the invention, the transmitter includes an output signal generator which outputs a transmission signal. The amplitude of the transmission signal is controlled responsive to an amplitude control signal. According to another aspect of the invention, the amplitude is controlled as a function of the frequency and pulse duration of the transmission signal.

According to another aspect of the invention, the transmitter is of a trainable type including a receiver which inputs a radio frequency control signal in a training mode. The receiver is disabled when the transmitter is transmitting an output signal.

The transmitter according to the invention provides improved transceiver operation as the signals emitted from the transceiver have a high signal-to-noise ratio. Additionally, the output signal amplitude of the transmitter is adjusted to compensate for variations in the strength of signals output by the transmitter at different frequencies.

These and other features, objects and advantages of the present invention can best be understood by reading the following description thereof together with reference to the accompany drawings in which:

DETAILED DESCRIPTION OF THE PREFERRED EMBODIMENTS

Figure 1:
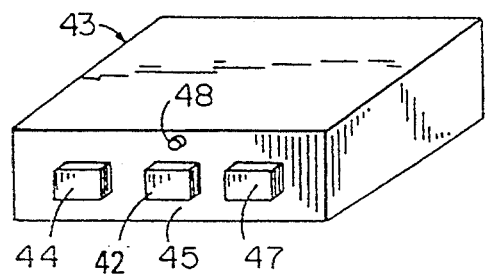
FIG. 1 is a perspective view of a housing for the trainable transmitter according to the present invention.
Figures 2, 3:
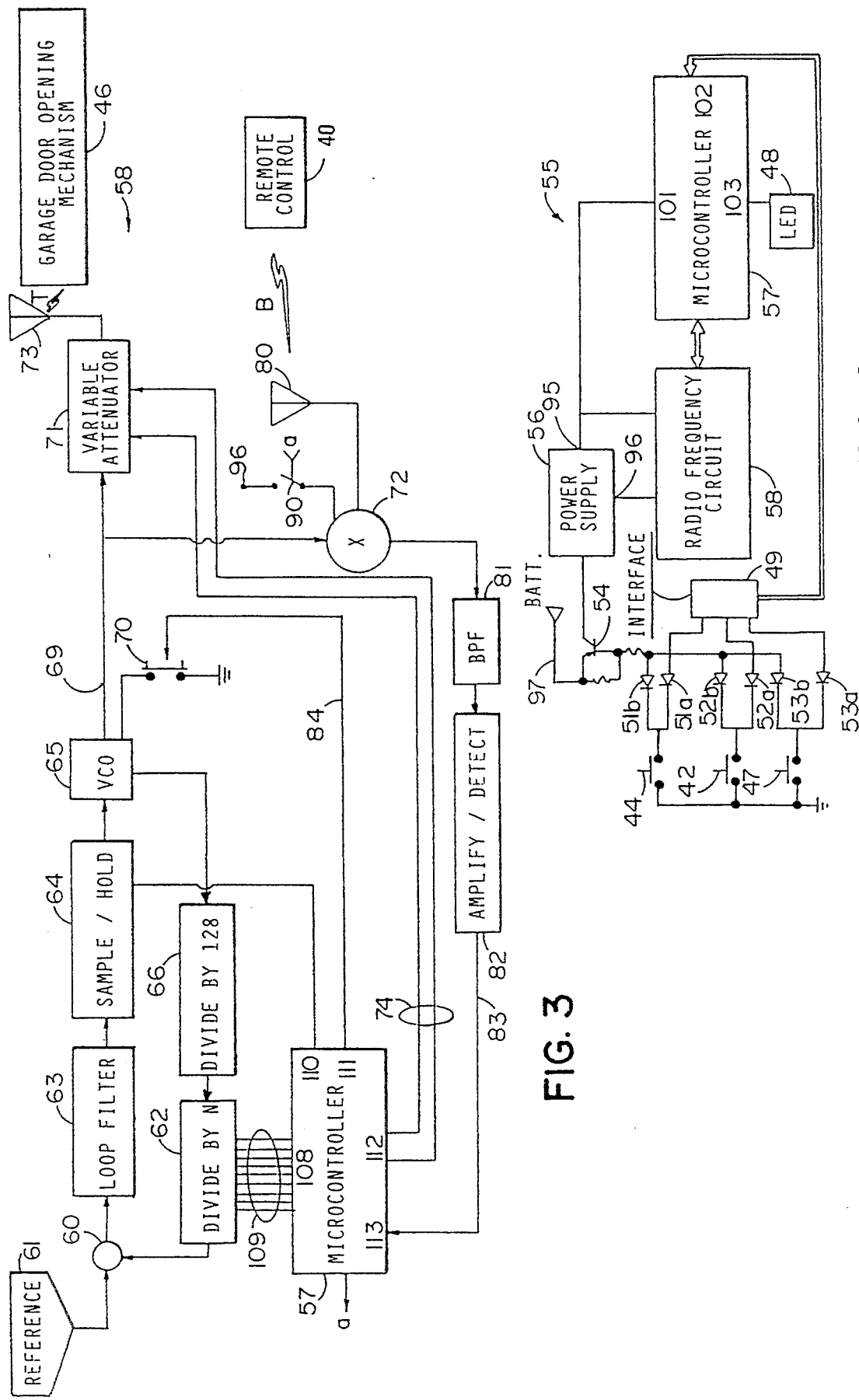
FIG. 2 is an electrical circuit diagram partly in block and schematic form of a transceiver embodying the present invention.
FIG. 3 is an electrical circuit diagram partly in block diagram form of a transceiver embodying the present invention.

Referring initially to FIG. 1, the invention is integrated into a small, generally square module housing 43 including a transceiver 55 (FIG. 2) which selectively transmits coded radio frequency (RF) energy as indicated by arrow "T" to a device controlled by an RF control signal, such as a garage door opening mechanism 46 shown in block form in FIG. 3. The conventional garage door opening mechanism 46 includes a receiver and a control circuit (not shown) which respond to the control signal "T" for opening and closing a garage door. Transceiver 55 includes a programmable microcontroller 57 which controls a radio frequency (RF) circuit 58 to generate signal "T". Signal "T" has a frequency and code learned from signal "B" and transmitted by existing remote control transmitter 40 while transceiver 55 is in a training mode, as described in greater detail below. The transceiver can then transmit the stored signal as remote control signal "T" to activate garage door opening control mechanism 46 (FIG. 3) without further need for the remote transmitter 40. Transmitter 40 is typically provided with the garage door opening mechanism 46 and generates control signal "B" for remotely actuating the garage door opening mechanism, but suffers from the storage and use problems described in co-pending patent application 07/567,390 incorporated herein above by reference.

Somewhat more particularly, housing 43 is small such that it may be installed in a variety of locations in the vehicle, such as in an overhead counsel, a map light, the instrument panel or any other suitable position in the vehicle. The transmitter includes three switches 44, 42 and 47 in a front panel 45. Each switch is associated with a respective channel. A channel includes one control signal for remotely actuating one mechanism. For example, the three channels may have three signals associated with three, respective, garage door opening mechanisms. Alternatively, two of the channels can have signals for two, respective, garage door openers, and the third channel can have a signal for controlling an interior light, exterior lights, or the like.

Still more particularly, each of switches 45, 42 and 47 is used to train and actuate its respective channel. For example, when one of these switches is held for less than a predetermined time period (e.g., less than 20 seconds), transmitter 55 will transmit the signal stored for that channel. If the switch is held for longer than the predetermined time period, the microcontroller will enter the training mode for the channel associated with that held switch.

An LED 48 is provided on panel 45 to inform the operator of the operational mode. For example, the LED is illuminated continuously while the signal is being transmitted. When the transmitter is in the learning mode, the LED flashes. When the training mode is finished, the LED flashes at a rate five times faster than the learning mode rate.

Although the overall preferred mounting environment is described with respect to the generally square housing, the transmitter according to the invention may be used in other environments. For example, the improved transmitter of the immediate invention may be used in a mirror as disclosed in The United States patent application 07/567,390, the disclosure of which is incorporated herein above by reference thereto.

Having briefly described the overall preferred mounting environment and operation of the transmitter, and its relationship to a vehicle, a detailed description of the preferred embodiment is now presented in connection first with the circuit diagram of FIGS. 2 through 4, and subsequently with reference to the program flow diagrams of FIGS. 5 and 6. Referring to FIG. 2, RF transceiver circuit 55 is mounted within module housing 43. Switches 44 (FIG. 4), 46 and 47 are connected through respective diodes 51a, 52a and 53a and a conventional interface 49 to microcontroller 57. Microcontroller 57 includes three inputs 102, each of which is connected to a respective one of switches 44, 42 and 47. The microcontroller inputs are pulled to ground when its respective switch is closed. Switches 44, 42 and 47 are also connected through diodes 51b, 52b and 53b to a switch 54. Switch 54 is connected between the vehicle battery supply and power supply 56 such that it is closed when any one of switches 44, 42 and 47 is closed.

Power supply 56 converts operating power from the vehicle battery supply to the necessary voltage levels in a conventional manner for activation of the electrical circuits when switch 54 is closed. Circuit 55 includes microcontroller 57 coupled to an RF circuit 58. Circuit 55 also includes indicator LED 48, which is illuminated when one of switches 44, 42 and 47 is closed and flashes when the circuit enters the training mode for one of the switches.

As seen in FIG. 3, RF circuit 58 includes a summing circuit 60 which sums a signal output from reference signal generator 61 and a signal output from a divide-by-N-divider 62. Reference generator 61 generates a fixed frequency signal, and may be provided by a commercially available crystal oscillator with an output frequency of approximately 8 Mhz and a divider which reduces the reference frequency signal to 7.8125 KHz. Divider 62 is provided by any suitable commercially available divider, such as an integrated circuit model number 145151 or 145106. The output signal from the summing circuit is coupled to the input of the loop filter 63, which is preferably an active integrator including an operational amplifier and a capacitor. The output of the integrator is a DC signal which is applied to the input of a sample-and-hold circuit 64. Sample-and-hold circuit 64 is of any suitable, conventional construction, such as a switch and a capacitor (not shown) or an amplifier with associated circuit components. In either case, the sample-and-hold circuit is controlled by a control signal from output 110 of microcontroller 52. The output of sample-and-hold circuit 64 is applied as a control input signal to a voltage controlled oscillator (VCO) 65.

The output frequency of VCO 65 will increase or decrease according to the magnitude of the control input voltage from sample-and-hold circuit 64. The voltage controlled oscillator may be provided by any suitable voltage controlled oscillator which is tunable to frequencies between 200 and 400 MHz with an input tuning control voltage of 0-7 volts, and adapted to operate in the automobile environment. In a preferred embodiment of the invention, VCO 65 is of a type including two varacter diodes, two transistors, capacitors, resistors and an inductor coupled to provide the desired frequency output for a given input voltage. A switch 70 is connected to VCO 65 such that the VCO generates an oscillating output signal only when switch 70 is open. When switch 70 is closed, the VCO is disabled by connecting an internal junction to ground. Switch 70 may be of any suitable construction, such as a bipolar transistor, an FET, a relay switch, or the like. Sample-and-hold circuit 64 holds the control input voltage to VCO 65 at a set level when the VCO stops generating an oscillating output signal, such that the VCO will output a signal having the desired frequency when the VCO is switched from off to on.

The output of VCO 65 is input to a divide-by-128 divider 66, a variable attenuator 71 and a mixer 72. Variable attenuator 71 includes two series circuits, each of which has an impedance element and a switch connected between a node of a divider network and ground for controlling the magnitude of the output signal of VCO 65, such that the amplitude of the signal output from VCO 65 is adjusted. In one implementation of the invention, variable attenuator 71 includes two resistors connected in parallel between antenna 73 and ground. Each resistor is connected in series with a bipolar transistor. The switch may also be implemented by an FET or the like. In operation, one of the transistors, both of the transistors, or neither transistor is activated to shunt the output voltage of VCO 65 through its respective resistor depending upon the amplitude control signal which is generated in microcontroller 57 as described in greater detail hereinbelow.

Mixer 72 combines the signal output from VCO 65 with signal "B" from remote control 40, which is received by antenna 80. The output signal from mixer 72 is applied to filter 81, and will have a frequency of 3 MHz when the output of VCO 65 is 3 MHz greater than the frequency of the signal for remote control 40. A conventional bandpass filter 81 has a center frequency of 3 MHz to pass the detected signal output from mixer 72, which is applied to the input of the amplifier/detector 82. Amplifier/detector 82 includes a half-wave rectifier, provided by a series diode (not shown), and an amplifier. The output of amplifier/detector 82 is a digital signal applied to input 113 of microcontroller 57.

A switch 90 (FIGS. 3 and 4) is connected between the power supply output 96 and mixer 72. In one implementation of the invention, mixer 72 (FIG. 4) includes an input 92 connected to antennae 80 and VCO 65. Mixer 72 includes a transistor and associated capacitors, resistors and an inductor, which are connected to an amplifier and rectifier. The amplifier includes a transistor and associated resistors and capacitors. Switch 90 is connected between the supply rail 93 for mixer 72 and amplifier 82 and the power supply 96. Switch 90 is connected to microcontroller 57 in a conventional manner, and is responsive to an output signal from the microcontroller to disable the mixer and amplifier. More specifically, the switch is closed when the transmitter is emitting a signal and the switch is open when a signal is received in a training mode. Although the switch is illustrated as an NPN bipolar transistor, it may be provided by any suitable means such as an FET device having a control input connected to microcontroller 57, a relay switch, or the like.

Microcontroller 57 controls the operation of circuit 55 and may be provided by any suitable commercially available integrated circuit, such as IC Model No. MC68HC05P4 commercially available from Motorola. The microcontroller preferably includes a nonvolatile memory in which the microcontroller program is stored. The power supply 56 (FIG. 4) provides a regulated 5 volt DC reference potential at terminal 95 and a regulated 12 volt DC reference potential at terminal 96. Circuits for providing the regulated voltage are well-known and, accordingly, will not be described in further detail herein. Power supply 56 receives power from the vehicle battery through switch 54 and battery positive conductor 97. The microcontroller 57 includes a power supply input 101 connected to the 5 volt power supply output 95 to receive power therefrom. Accordingly, when one of switches 44, 42 and 47 is closed, closing switch 54, power is supplied to RF circuit 58 and microprocessor 57. When switch 54 is open (switches 44, 42 and 47 are open), the microcontroller and radio frequency circuit are disabled since the power supply is disabled. Terminals 102 of microcontroller 57 are connected to the three switches 44, 42 and 47 by respective diodes as indicated above. Output terminal 103 is connected to LED 48 to energize the LED in the manner described below.

The RF circuit 58 connected to microcontroller 57 includes all of the circuit elements shown in FIG. 3, except for microcontroller 57, garage door opener mechanism 46, and the existing remote control 40. Outputs 108 of microcontroller 57 are connected to divide-by-N divider 62 through multiconductor bus 104. Bus 104 is connected to the control input of divide-by-N divider 62 to select the frequency of the signal output by divide-by-N divider 62. Output 110 of microcontroller 57 is connected to control the sample-and-hold circuit 64 to hold the signal level input to the VCO when switch 70 is closed such that VCO 65 does not output oscillating signals. Output 111 of microcontroller 67 is connected to the control input of switch 70. Outputs 112 of microcontroller 57 are connected to variable attenuator 71 to select the degree of attenuation to be provided to the signal output from VCO 65. Signals received by antenna 80 are connected to data input 113 of microcontroller 57 through mixer 72, bandpass filter 81 and amplifier detector 82.

Figure 4:
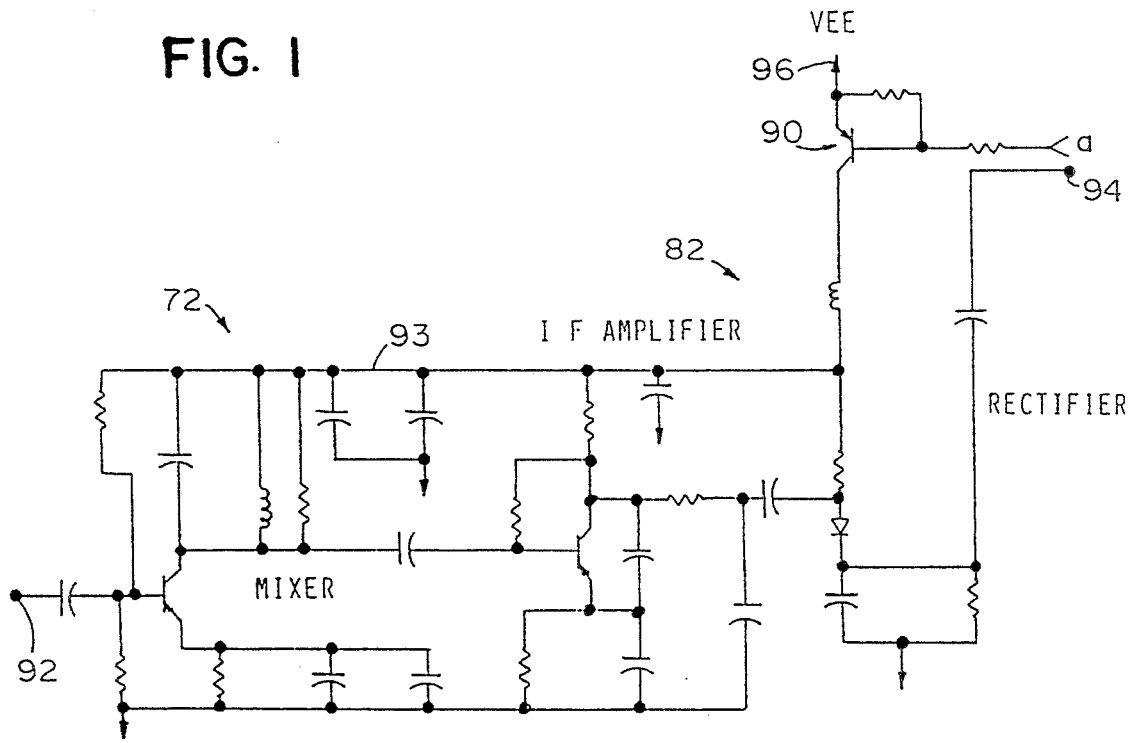
FIG. 4 is a circuit schematic of a mixer for the circuit according to FIG. 3.

The circuit represented by FIGS. 2 through 4 is a self-contained trainable transmitter for the environment illustrated in FIG. 1. It will be recognized that microcontroller 57 may include additional inputs and outputs for the environment illustrated in FIGS. 1 and 2 of the above-identified application Ser. No. 07/874,361.

The main program for the microcontroller 57 of trainable transmitter 55 will now be described with reference to FIGS. 5a–5c, 6, 7, and 8.

Figure 5A:
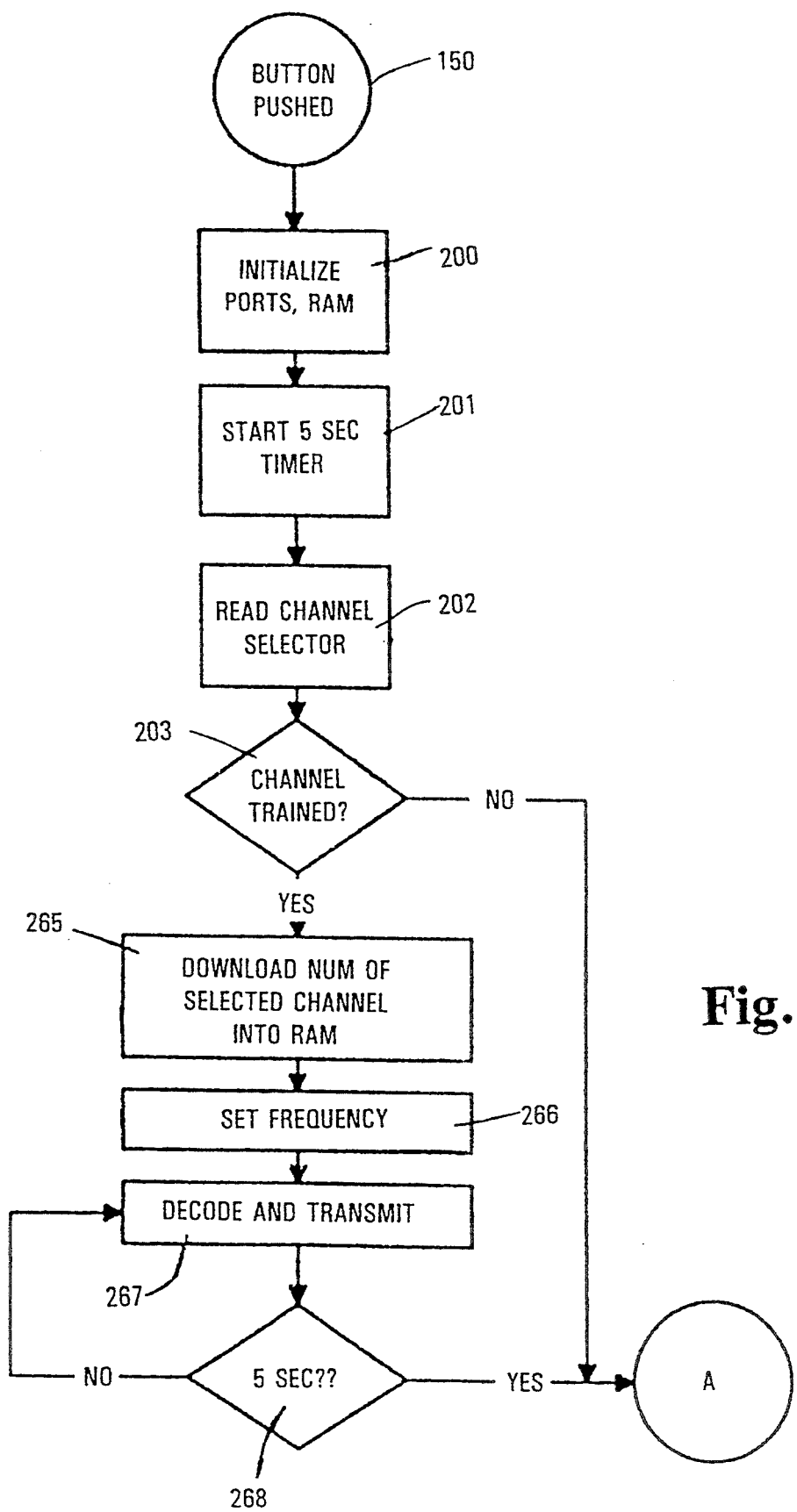
FIGS. 5a, 5b, and 5c are a flow diagram of the main-program employed in the micro-controller of the programmable control circuit shown in FIGS. 2 and 3.
Figure 5B:
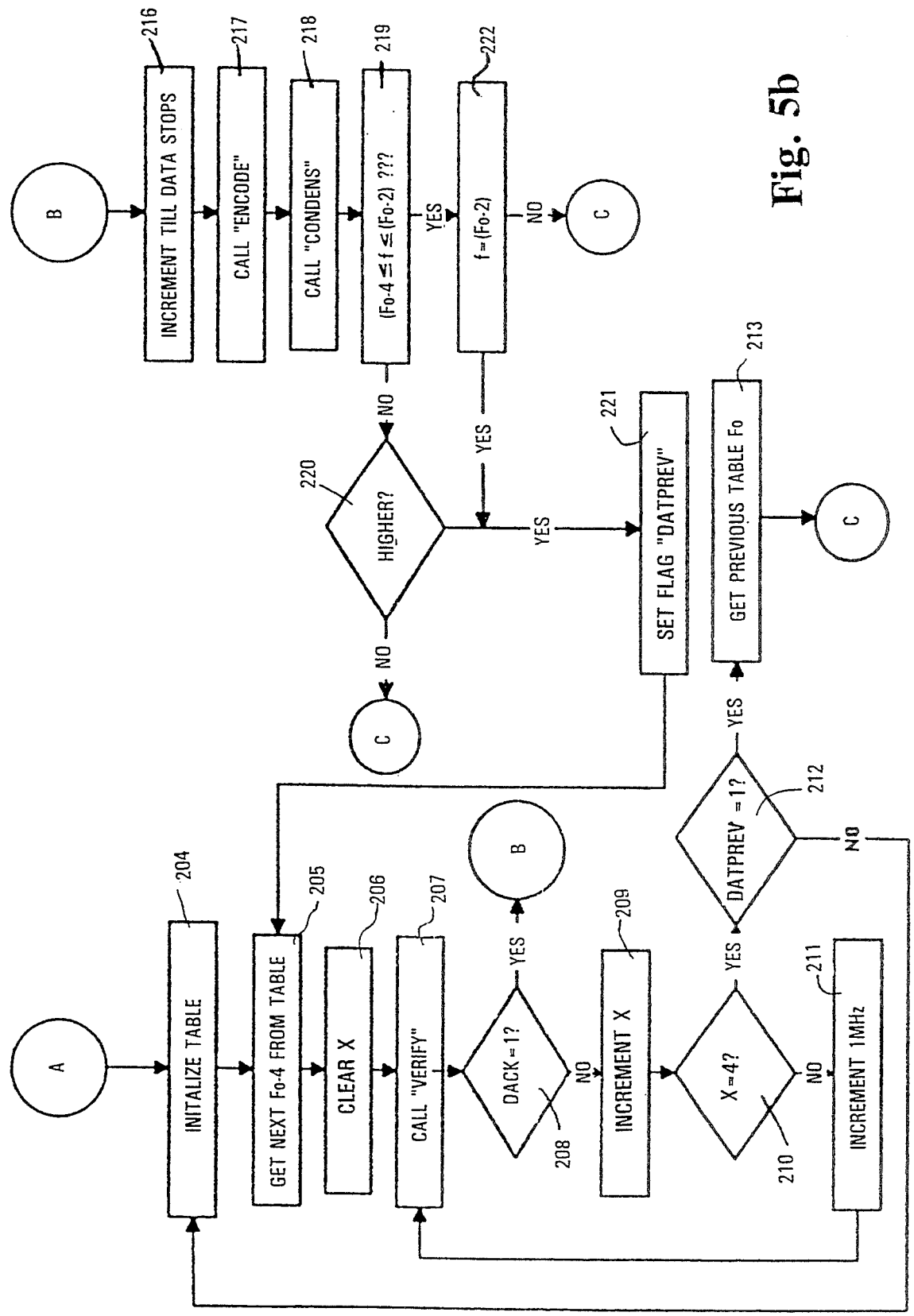

The program begins when switch 44, 42, or 47 (FIGS. 1 and 2) of the trainable transmitter is pushed such that the battery positive conductor 97 (FIG. 2) is connected to power supply 56 as indicated by block 150 in FIG. 5a. Power supply 56 generates a 12 volt DC supply potential provided to RF circuit 58 and a 5 volt DC power supply provided to micro-controller 57 and RF circuit 58. The 5 volt DC supply potential provided to micro-controller 57 powers up the micro-controller. Upon power up, the micro-controller initializes its ports and clears its internal random access memory (RAM) in a conventional manner, as indicated by block 200. After the micro-controller initializes the ports and the RAM, a 15 second timer is started as indicated in block 201. The actual amount of the time in this timer may be as short as 5 seconds or as long as 20 seconds. The micro-controller program then reads inputs 102 to determine which one of switches 44, 42, and 47 (FIGS. 1 and 2) was pressed to determine whether channel 1, 2 or 3 is selected by the user, as indicated in block 202. The micro-controller program determines whether the channel selected by the user is already trained, as indicated in decision block 203. If the selected channel is not trained, the micro-controller program initializes a pointer associated with a frequency table, as indicated in block 204 of FIG. 5b.

The frequency table includes frequency control words for all the frequencies at which data is expected. Remote control transmitters which are utilized to control garage door openers have certain frequencies at which they operate. The table contains frequency control signals which control divide-by-N counter 62 to output a signal which controls the RF circuit to selectively generate output signals at these known frequencies. The table is dynamic, such that additional memory locations are provided in the non-volatile memory which may be accessed to store a new frequency control signal without remasking the nonvolatile memory. For example, the micro-controller non-volatile memory can be an electronically erasable programmable read only memory (EEPROM) and the transceiver housing can include a port (not shown) through which the EEPROM is externally accessed for programming the non-volatile memory to include a new frequency. Alternately, a functional tester (not shown) utilized in the manufacturing process, which examines the non-volatile memory, may be used to store additional frequency control signals in the non-volatile memory.

Accordingly, frequency control words may be added to accommodate different frequencies which garage door opener mechanism manufacturers add at a later time.

The frequency control word identified by the table pointer controls RF circuit 58 to generate an output signal at a frequency F to detect a possible frequency $F_o$ of signal B from remote control 40. The frequency $F_o$ is detected when VCO 65 outputs a signal F which is 3 MHz below $F_o$. The micro-controller program initially selects a frequency control word which controls the VCO 65 to output a signal which is 4 MHz less than frequency $F_o$, as indicated in block 205. The micro-controller program clears an X register, which is an eight bit register internal to the micro-controller, as indicated in block 206. The X register is utilized as a counter. The micro-controller program next calls a "VERIFY" subroutine as indicated in block 207, which determines whether data is being received by the micro-controller and is described below in greater detail in connection with FIG. 6. If data is being received, an internal data acknowledge flag (DACK) is set, and the micro-controller program determines whether the data is being received by examining the DACK flag, as indicated in decision block 208. If data is not being received, the X register is incremented, as indicated in block 209. If the count in register X is less than 4, as determined by the micro-controller in decision block 210, the frequency output by VCO 65 is increased by 1 MHz. The program then repeats steps 207–211 until data is received, as indicated by the DACK flag, or the count in register X reaches 4. If the count in register X reaches 4 before data is received, the micro-controller program determines whether data was previously detected by checking a DATPREV flag, as indicated in block 212.

If it is determined that data is received, such that the DACK flag is set, the micro-controller program determines whether the frequency $F_o$ selected by the frequency control word is the best frequency for emulating the signal from remote control 40. Data should be detected at input 113 of micro-controller 57 when frequency F output by VCO 65 is 3 MHz less than the frequency $F_o$ from remote control 40. The roll-off characteristic of filter 80 is such that data will sometimes be detected when the frequency output by VCO 65 is within the range which is 4 MHz to 2 MHz below the signal from remote control 40. Accordingly, the micro-controller program must be able to distinguish between frequencies one MHz apart.

To distinguish between frequencies which are one MHz apart, the micro-controller program determines frequencies at which data is detected. To accomplish this, the frequency output by VCO 65 is increased in one MHz increments until data is no longer detected by the micro-controller as indicated in block 216 (FIG. 7b). When the frequency F is incremented such the data is no longer detected, the desired frequency is one MHz less than the highest frequency at which the data was detected.

The micro-controller next calls the "ENCODE" subroutine as indicated in block 217. The ENCODE subroutine is described in greater detail hereinbelow. The micro-controller program digitizes the data input to the micro-controller in the ENCODE subroutine. Following the ENCODE subroutine, the "CONDENSE" subroutine is called as indicated in block 218. Because a sequence of data stored in the ENCODE subroutine typically includes more than one data word which is sequentially repeated. The CONDENSE subroutine locates the start and stop points of the repeated word so that the data word is only stored once as described hereinbelow.

Figure 5C:
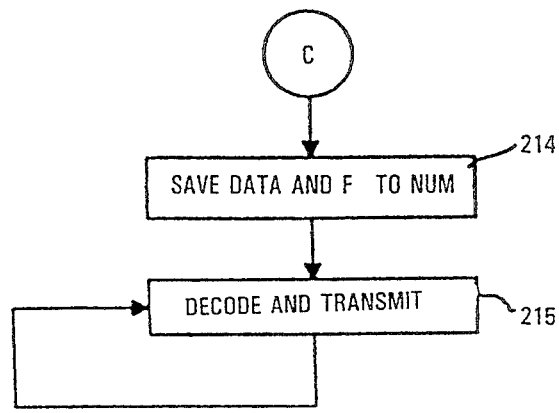

After the data is encoded and condensed, the micro-controller program determines the best carrier frequency $F_o$ to emulate signal B. For example, if data is detected when the frequency F of the output signal of VCO 65 is 298 MHz, 299 MHz, and 300 MHz, and data is no longer detected when the frequency F is 301 MHz, the best frequency F to look for data is 299 MHz, and the frequency $F_o$ of the remote control signal B is 302 MHz. In block 219, the micro-controller program determines whether the frequency F output by VCO 65 is greater than or equal to $F_o$-4 MHz or less than or equal to $F_o$-2 MHz. If the carrier frequency F is greater than or equal to $F_o$-4 MHz and less than or equal to $F_o$-2 Mhz, the micro-controller program determines whether frequency F is equal to $F_o$-2 MHz as indicated in block 222. If the frequency does not equal $F_o$-2 MHz as determined in block 222, the data detected in the ENCODE subroutine and carrier frequency $F_o$ are stored in the micro-controller non-volatile memory. The micro-controller program then decodes and transmits the stored data signals at frequency $F_o$ as indicated in block 215 (FIG. 5c).

If it is determined that the frequency F of the output signal of VCO 65 is not grater than or equal to $F_o$-4 MHz and less than or equal to $F_o$-2 MHz in decision block 219 (FIG. 5b), the micro-controller program determines whether the frequency is higher than $F_o$-2 MHz as indicated in decision block 220. If the frequency is less than $F_o$-4 MHz, the micro-controller stores the frequency $F_o$ as indicated in block 214 (FIG. 5c) and transmits the frequency and data stored, as indicated in block 215. If it is determined in decision block 220 that the frequency is higher than $F_o$-2 MHz, or if it is determined in block 222 that the frequency equals $F_o$-2 MHz, the micro-controller sets the DATPREV flag to a logic 1, and returns to block 205 to analyze the next frequency in the frequency table. The micro-controller program repeats steps 205–210 until the DACK flag is set or the count in register X equals 4. If the count equals 4, and no data is detected at the current frequency $F_o$, the micro-controller determines whether the DATPREV flag is set in block 212. If the DATPREV flag is set, as determined in block 212, the micro-controller program retrieves the previous table frequency $F_o$ from memory as indicated in block 213. The micro-controller will save the data and the previous frequency $F_o$ in the non-volatile memory as indicated in block 213. The micro-controller will then decode and transmit the stored code and frequency as indicated in block 215.

Figure 6:
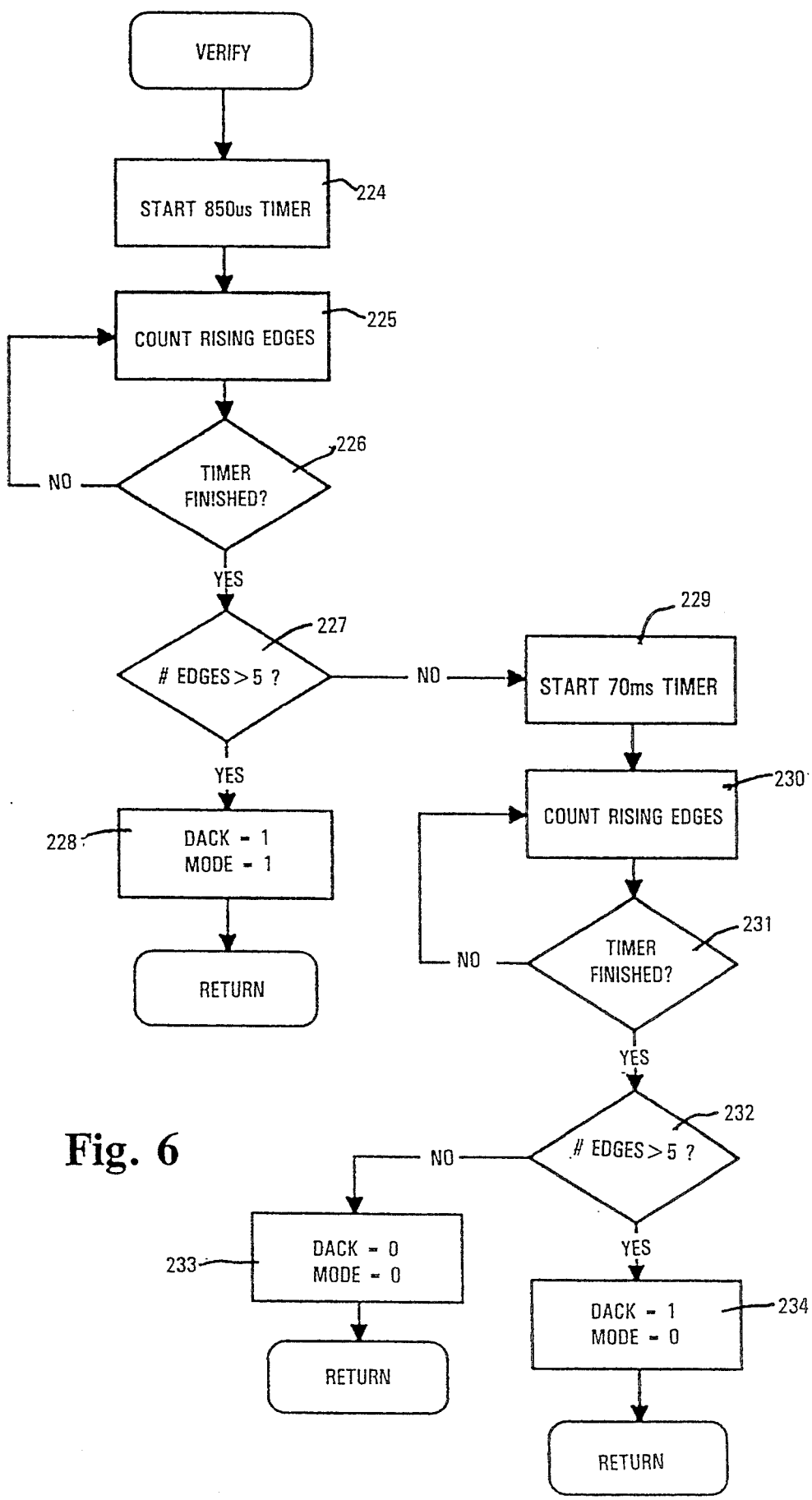
FIG. 6 is a flow diagram for one of the program subroutines shown in FIGS. 5a–5c.

In the VERIFY subroutine shown in FIG. 6, the micro-controller program determines whether data is being received as indicated briefly above. The micro-controller program first initiates and starts an 850 microsecond timer, as indicated in block 224, and counts rising edges, as indicated in block 225. The micro-controller program continues to count rising edges until the 850 microsecond timer times out, as indicated in decision block 226. When the timer times out, the micro-controller program determines whether the number of edges is greater than five, as indicated in block 227. If more than five edges are detected in the 850 microsecond interval, the DACK flag is set to 1 and the mode is set to 1 as indicated in block 228. In mode 1, the micro-controller has identified amplitude modulated frequency shift key data, such as used by garage door opening systems marketed under the Genie trademark. If five edges were not detected in the 850 microsecond time interval, as determined in decision block 227, a 70 ms timer is started as indicated by block 229. Rising edges are detected and counted during the 70 ms period. When the timer times out, the micro-controller counts the number of edges detected during the 70 ms period. If more than five edges are detected as determined in block 232, the DACK flag is set and the mode is set to 0 as indicated in block 234. Mode 0 indicates that the data format is a binary code associated with a carrier signal. If fewer than five edges are detected in the 70 ms time interval, the DACK flag is set to 0, as indicated in block 233, indicating that data was not acknowledged, and the micro-controller returns to the main program.

Figure 7:
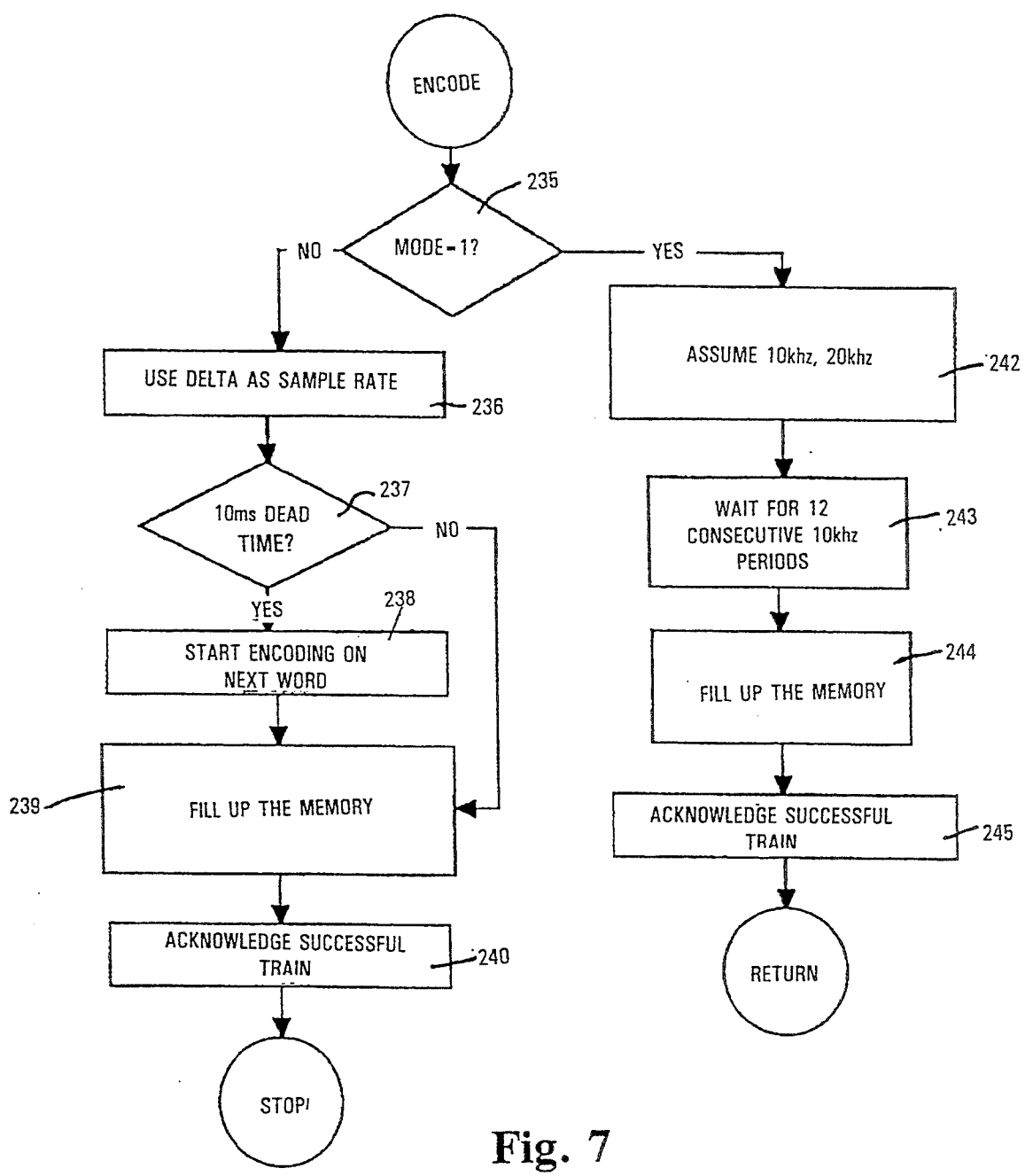
FIG. 7 is a flow diagram for one of the program subroutines shown in FIGS. 5a–5c.

In the ENCODE subroutine shown in FIG. 7, the micro-controller first determines whether the code is a 0 or a 1 mode, as indicated in decision block 235. If the mode is 0, the micro-controller program samples the input 113 every 68 microseconds as indicated in block 236. The micro-controller program then determines whether a 10 ms dead time has elapsed in decision block 237. If the 10 ms time interval has elapsed, the micro-controller starts encoding on the next detected leading edge. Each 68 microseconds, the micro-controller samples the input. The samples are stored until the memory allocated to the samples is full. If it is determined in block 237 that a 10 ms dead time was not present in the samples, the data is sampled and stored in memory as it is received at input 113. The data samples are stored until the memory is filled as indicated in block 239. After the memory is filled, the micro-controller program acknowledges a successful train by flashing LED 48.

If the micro-controller determines that the code is mode 1 in decision block 235, the micro-controller assumes that the frequency of the signals being received alternate between 10 KHz and 20 KHz frequencies as indicated in block 242. The micro-controller waits for 12 consecutive 10 KHz samples before storing the received code in memory as indicated in block 243. The received code is stored in memory until the allocated memory is filled, as indicated in block 244. The micro-controller then acknowledges the successful train by flashing LED 48 before storing the received code in memory, as indicated in block 243. The received code is stored in memory until the allocated memory for storage of the code is filled, as indicated in block 244.

Figure 8:
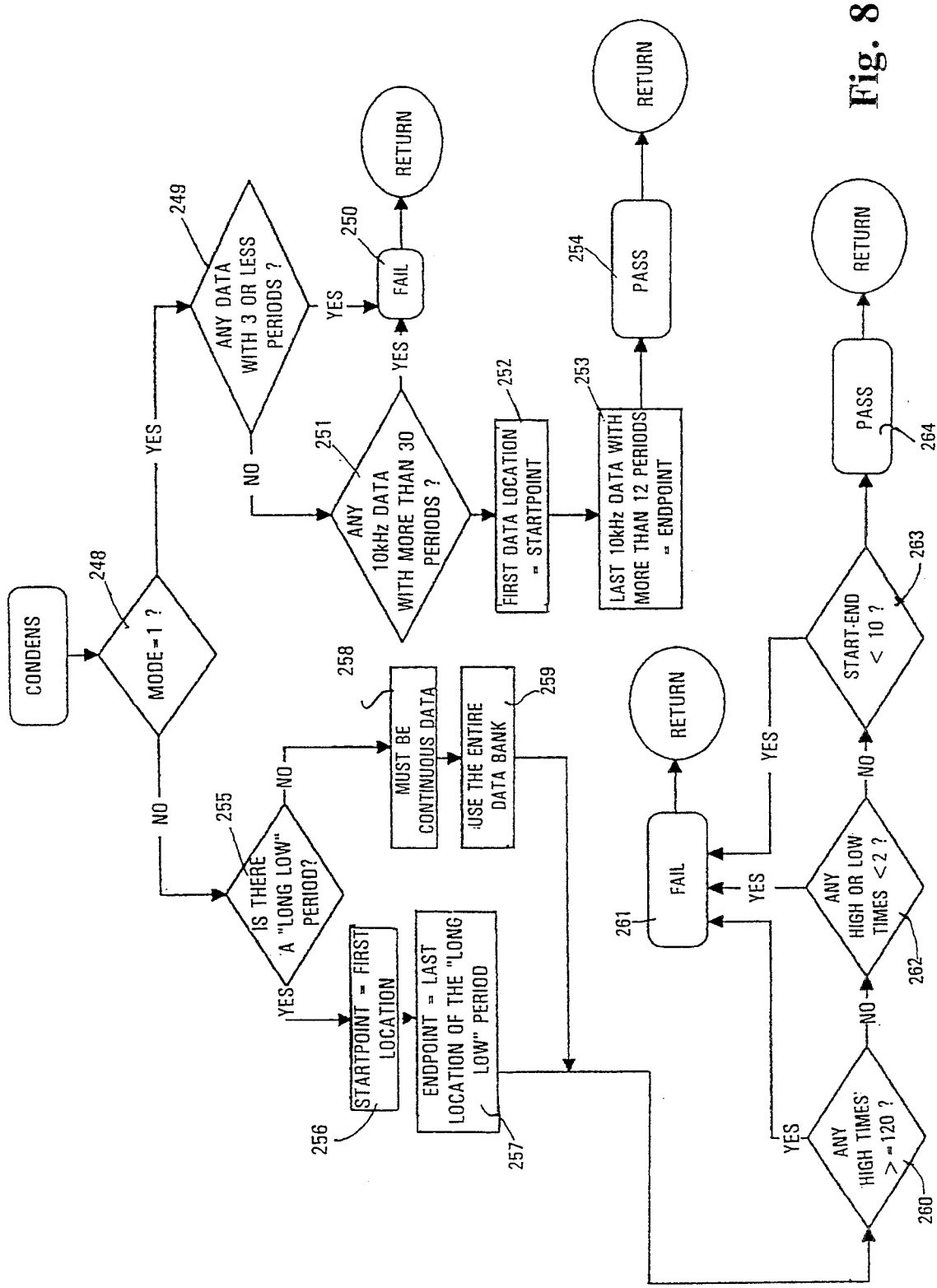
FIG. 8 is a flow diagram for another program subroutine shown in FIGS. 5a–5c.

In the CONDENSE subroutine shown in FIG. 8, the micro-controller program first determines whether the code is mode 1 or mode 0 code, as indicated in block 248. If the code is mode 1, the micro-controller program determines whether the 10 KHz or 20 KHz signals stored in memory during the ENCODE subroutine have three or fewer periods, as indicated by decision block 249. If one of the frequencies stored in the memory has three or fewer periods, the micro-controller program acknowledges a failure of the training by flashing LED 48 at a rate different from that of the successful train acknowledgment, and the micro-controller returns to the main program.

If the data does not contain three or fewer periods, the micro-controller determines whether the 10 KHz signal has more than thirty periods, as indicated in block 251. If the micro-controller determines that the 10 KHz data has more than thirty periods, the micro-controller program acknowledges a failure as indicated in block 250, and the program returns to the main program. If it is determined that the data does not have more than thirty 10 KHz periods, the data is presumed to be valid. The first data location in the memory is the starting point for the code stored therein. The memory locations are filled until twelve consecutive 10 KHz periods are detected. Thus, the first memory storage location is the beginning of the data word, and the last 10 KHz sequence of twelve consecutive periods is the end point of the word. The micro-controller recognizes a valid train after the sequence of twelve 10 KHz data periods as indicated in block 254.

If it is determined in block 248 that the program is in mode 0, the micro-controller program determines whether there is a long period without a high logic level stored in memory. If there is a long period without a high logic level signal, the starting point of the data word is the first location in the memory, as indicated in block 256. The end point of the data word is the last location in the memory associated with the long low period. The stored data word is thus repeated in the signal "T" transmitted to activate the garage door opening mechanism. If the micro-controller determines that there is no long period without high logic levels in decision block 255, the micro-controller program determines that the data stored in the memory is continuous data as indicated in block 258, and all the data stored in the memory in the ENCODE subroutine is transmitted as indicated in block 259. The micro-controller program determines whether 120 consecutive samples are high logic levels as indicated in block 260. If 120 consecutive samples are high logic level signals, the micro-controller determines that the data stored is contaminated and a failure is signaled using LED 48 as indicated in block 261.

If the micro-controller program passes the test of decision block 260, the micro-controller program determines whether at any location in the data word less than three consecutive samples are at a high or a low logic level, as indicated in decision block 262. This indicates that a noise spike has contaminated the data. If less than three consecutive samples are at single logic level, a failure is detected and the micro-controller program signals a failure using LED 48 as indicated in block 261. If the data passes the test of decision block 262, the micro-controller determines whether the entire data word is stored in less than ten memory locations, as indicated in decision block 263. If the entire word is stored in fewer than ten memory stack locations, the micro-controller identifies a failure as indicated in block 261. If the data passes the test of decision blocks 260, 262 and 263, the micro-controller program identifies a valid training session and returns to the main program.

If one of the GDO activate/train switches 44, 42, and 47 is pushed, the fifteen-second timer is initialized in block 201 (FIG. 5a), the panel selector is read and the channel identified by the channel selector is trained, as determined in decision block 203, the micro-controller program downloads frequency $F_o$ and the data word stored in the non-volatile memory associated with the selected channel. The frequency of the divide-by-N counter is set by the signal at outputs 108 of micro-controller 57. Additionally, the attenuation select output 112 is utilized to set the variable attenuator 71 inversely to the duty cycle of the data being transmitted. Thus, if the duty cycle of the control pulses input to switch 70 are long, the amplitude of the signals output through antenna 73 will be proportionally less than the amplitude of signals output from antenna 73 when the pulses have a short duty cycle.

As indicated above, the transceiver includes two training modes for learning two different signal types. In mode 0, an oscillating carrier signal is transmitted when switch 70 is open. The carrier signal is not transmitted when switch 70 is closed. In mode 1, a signal alternating between 10 KHz and 20 KHz signals is continuously transmitting. In mode 1, the number of periods transmitted at each frequency represents the code of the transmitted signal. Because the carrier signal is continuously transmitted in mode 1, the variable attenuator is set to maximum attenuation in mode 1.

Thus, it can be seen that a trainable garage door transmitter is provided which is adapted for use in any remote control garage door opener and includes the flexibility to learn different garage door opener remote control formats. Additionally, the trainable garage door transmitter allows the micro-controller to vary the amplitude of transmitted pulses proportionately to the duty cycle of the transmitted pulses. The trainable transmitter also includes a training technique wherein an input frequency is adjusted until the internal frequency matches an external frequency received by a garage door opener remote control during training. Additionally, the trainable garage door opener has the capability of increasing the number of frequencies identified by control words stored therein. This allows the number of frequency control words to be minimized, reducing the number of frequencies which must be tested to thereby reduce the training time and memory storage requirements of the table, while allowing the number of frequencies to be accommodated. Thus, a flexible and efficient system provides a trainable transmitter in a vehicle which can be integrated into the vehicle as original equipment and replace portable existing transmitters.

Figure 10:
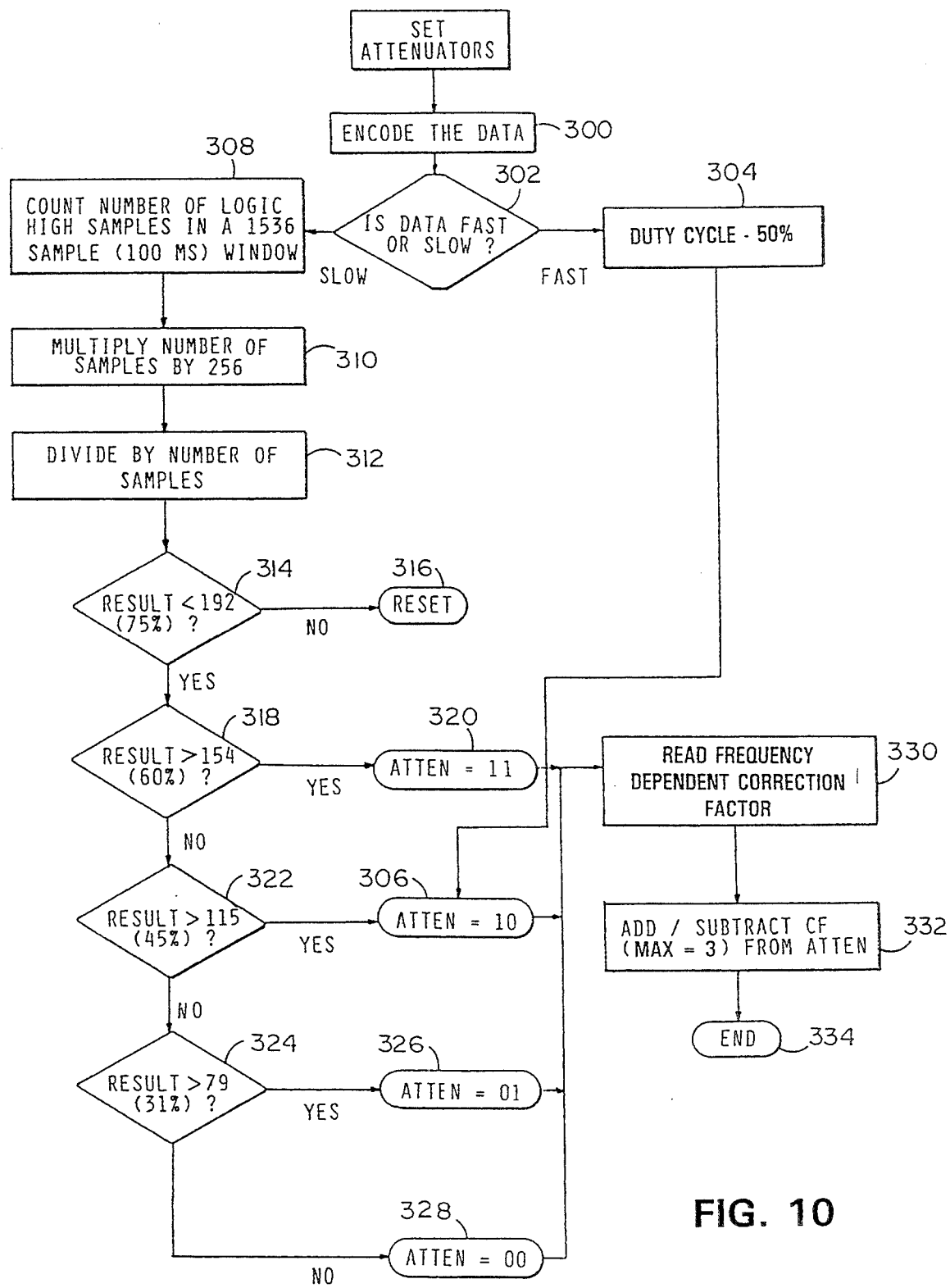
FIG. 10 is a flow diagram for a program subroutine for setting the attenuation level.

In the training mode, the program trains to data in the control signal "B" in an encode subroutine. After the encode subroutine is completed, the set attenuators subroutine of FIG. 10 is called. The set attenuator subroutine will now be described with reference to FIG. 10. Initially, the encoded data is retrieved from memory as indicated in block 300. The program determines from the encoded data whether it is fast or slow data, as indicated in decision block 302. This decision is made by determining whether the signal to be transmitted is mode 1 data or mode 0 data. Briefly, Mode 1 data is data that switches between two frequencies (e.g., GENIE brand garage door openers which switch between 10 KHz and 20 KHz). The duty cycle for these signals is 50% as indicated in block 304, and the attenuation is set to 10, meaning one attenuator is on and the other attenuator is off, as indicated in block 306. If the decision in block 302 is the data is slow data, meaning the data is mode 0 data, (e.g., garage door openers other than GENIE brand garage door openers) the program counts the number of logic high samples in a 100 msec. time window as indicated in block 308. The number of samples should be 1536, although the actual number might vary slightly. The number of high samples counted in block 308 is multiplied by 256 in block 310. The result determined in block 310 is divided by the total number of samples (e.g., 1536) as indicated in block 312.

Following the calculations of blocks 308, 310, and 312, the program sets the attenuators according to the duty cycle of the data. If the result of the decision in block 312 is greater than or equal to 192, as determined in decision block 314, there is an error in the encoding, and the program resets and retrains as indicated in block 316. If the result of decision block 312 is less than 192, indicating the high logic level duration is less than 75%, the program determines whether the result is less than 154, which corresponds to a high level signal less than 68%, as determined in block 318. If it is determined in block 318 that the high logic level duration is more than 68%, the attenuation is set to 11, which means both attenuators are on. If the high logic level duration is less than or equal to 68%, the program determines whether the result is greater than 115, which corresponds to a high logic level duration of less than 45%, in decision block 322. If it is determined in block 322 that the high logic level duration is more than 45%, the attenuation is set to 10 (first attenuator on, second off), as indicated in block 306. If it is determined that the high logic level is duration is less than or equal to 45%, the program determines whether the result is less than 79 in decision block 324. If the decision in block 324 is the result is greater than 79, the program sets the attenuation to 01, wherein the second attenuator is on and the first one is off. If the high logic level duration is less than 31%, the attenuation is set to 00, wherein both attenuators are off.

After the attenuators are set according to the pulse duration, the set attenuation is adjusted using a frequency dependent correction factor as indicated in block 330. The frequency dependent correction factor is dependent upon the frequency of the control signal. Preferably, a table is provided which indicates the relative strength of the transmitter at different frequencies. For example, the strength of signals output from the transmitter circuit of FIG. 3 may be measured at fixed intervals (e.g. every 1 KHz or every 10 KHz) and this information may be stored in the memory table. Alternatively, the strength of the transmitter may be measured at each of the frequencies at which garage door openers are known to operate. In either case, the correction factor is preferably dependent upon the FCC (Federal Communication Commission) amplitude limits on signal strength at each of the different frequencies. Thus, the attenuation factor is adjusted for variations in the strength of the signal emitted by the transmitter at each of the frequencies, and signal strength is decreased at those frequencies where the FCC limits the amplitude to a level below that produced by the transmitter. The correction factor has a binary value between 0 and three (i.e., 01, 10, 11) which is added to, or subtracted from, the attenuation values set in blocks 320, 306, 326 and 328. After the attenuation value is stored, the program returns to the main program as indicated in block 334.

Figure 9:
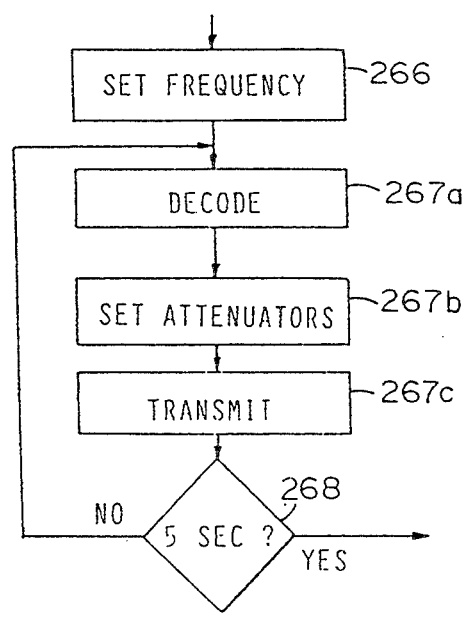
FIG. 9 is a partial flow diagram of a main program employed in the microcontroller of the programmable control circuit shown in FIGS. 2–3.

That portion of the main program shown in FIG. 5a, which calls the set attenuation subroutine of FIG. 10 and disables mixer 72 is shown in FIG. 9. Before transmitting a signal, the frequency is set in block 266 (FIG. 9), and the program downloads the data word stored in the nonvolatile memory in block 267a. The program sets the attenuators using the attenuation levels set by the set attenuators subroutine of FIG. 10, in block 267b, which is described in greater detail hereinbelow. The program will then transmit the code signal and disable mixer 72, as indicated in block 267c, for a period of up to twenty seconds. After five seconds, the program enters the training mode, as indicated by decision block 268, wherein the mixer is enabled.

It is envisioned that the set attenuators subroutine can be run each time that the program learns a frequency and control word in the training mode. The subroutine will be run for each channel independently. It is also envisioned that the subroutine could be run each time the transmitter is transmitting. In either case, the attenuators are set to the level determined in the set attenuators subroutine during transmission of the signal as indicated in FIG. 9.

Thus it can be seen that a transmitter is disclosed providing improved signal quality and amplitude control. The transmitter controls the attenuation according to the signal strength of signals output by the transmitter at different frequencies. Additionally, the attenuation can be controlled according to FCC regulations at different frequencies. For a trainable transmitter of the type transmitting and receiving signals, the circuit components for receiving a signal are disabled when transmitting a signal to reduce interference from the receiving circuit components.

It will become apparent to those skilled in the art that various modifications to the preferred embodiment described and disclosed herein can be made. Such modifications will, however, fall within the spirit or scope of the invention as defined in the appended claims.

The embodiments of the invention in which an exclusive property or privilege is claimed are defined as follows:

1. A trainable transmitter for learning and transmitting an activation signal that includes an RF carrier frequency modulated with a code for remotely actuating a device, said trainable transmitter comprising:
    a controller operable in a learning and an operating mode, said controller receiving the activation signal in said learning mode for storing data corresponding to the radio frequency and code of the activation signal, and in said operating mode, providing an output signal, which identifies the radio frequency and code of the received activation signal, and an attenuation control signal;
    a signal generator coupled to said controller, for receiving said output signal for outputting a modulated radio frequency carrier signal corresponding to the received activation signal; and
    an attenuator, coupled to said signal generator and to said controller, for receiving the attenuation control signal from said controller, for attenuating the modulated radio frequency carrier signal received from said signal generator at an attenuation level indicated by the attenuation control signal, and for transmitting an attenuated output signal to the device.

2. The transmitter as defined in claim 1, wherein said controller determines the attenuation level based upon signal characteristics of the received activation signal.

3. The transmitter as defined in claim 2, wherein said controller determines the attenuation level based upon the detected radio frequency carrier of the received activation signal.

4. The transmitter as defined in claim 2, wherein said controller determines the attenuation level based upon a detected pulse duration of control data provided in the received activation signal.

5. The transmitter as defined in claim 2, wherein said controller determines the attenuation level based upon both the detected radio frequency carrier of the received activation signal and a detected pulse duration of a control signal provided in the received activation signal.

6. The transmitter as defined in claim 1, wherein said attenuator comprises means for setting the attenuation level at one of four possible levels in response to the attenuation control data received from said controller.

7. The transmitter as defined in claim 6, wherein said controller comprises:
    fast/slow determination means for determining that control data provided in the received activation signal is fast when the control data is transmitted by switching between two different frequencies, and for determining that the control data is slow when the control data is not transmitted by switching between two different frequencies; and
    classification means for classifying a pulse duration of the control data as high, medium high, medium low, or low.

8. The transmitter as defined in claim 7, wherein said controller selects a first one of the four possible attenuation levels when (1) said fast/slow determination means determines that control data provided in the received activation signal is slow, and (2) said classification means classifies the pulse duration of the control data as high.

9. The transmitter as defined in claim 7, wherein said controller selects a second one of the four possible attenuation levels when (1) (a) said fast/slow determination means determines that control data provided in the received activation signal is slow and (b) said classification means classifies the pulse duration of the control data as medium high, or when (2) said fast/slow determination means determines that control data provided in the received activation signal is fast.

10. The transmitter as defined in claim 7, wherein said controller selects a third one of the four possible attenuation levels when (1) said fast/slow determination means determines that control dan provided in the received activation signal is slow, and (2) said classification means classifies the pulse duration of the control data as medium low.

11. The transmitter as defined in claim 7, wherein said controller selects a fourth one of the four possible attenuation levels when (1) said fast/slow determination means determines that control dan provided in the received activation signal is slow, and (2) said classification means classifies the pulse duration of the control data as low.

12. The transmitter as defined in claim 7, wherein said controller further comprises:
    pulse sampling means for taking a predetermined number of total samples of the control data within a predetermined period of time; and
    pulse duration calculation means for counting the number of samples of the control data having a high logic level, for multiplying the counted number of samples having a high logic level by a predefined constant to determine a product, and for dividing the product by the predetermined number of total samples to determine the pulse duration of the control data, wherein said classification means classifies the pulse duration of the control data as high when the calculated pulse duration is greater than 60%, as medium high when the calculated pulse duration is greater than 45% and less than or equal to 60%, as medium low when the calculated pulse duration is greater than 31% and less than or equal to 45%, and as low when the calculated pulse duration is less than or equal to 31%.

13. A method for learning and transmitting an activation signal that remotely actuates a device using a trainable transmitter, comprising the steps of:
receiving the activation signal in a learning mode;
generating radio frequency control data, which indicates a detected radio frequency carrier of the received activation signal, and attenuation control data, which indicates an attenuation level;
generating an output signal having a radio frequency carrier corresponding to that of the received activation signal;
attenuating the output signal at the attenuation level indicated by the attenuation control data; and
transmitting the attenuated output signal to the device.

14. The method as defined in claim 13, further comprising the step of:
determining the attenuation level based upon characteristics of the received activation signal.

15. The method as defined in claim 14, further comprising the step of:
determining the attenuation level based upon the detected radio frequency carrier of the received activation signal.

16. The method as defined in claim 14, further comprising the step of:
determining the attenuation level based upon a detected pulse duration of control data provided in the received activation signal.

17. The method as defined in claim 14, further comprising the step of:
determining the attenuation level based upon both the detected radio frequency carrier of the received activation signal and a detected pulse duration of a control signal provided in the received activation signal.

18. The method as defined in claim 13, further comprising the steps of:
determining that control data provided in the received activation signal is fast when the control data is transmitted by switching between two different frequencies;
determining that the control data is slow when the control data is not transmitted by switching between two different frequencies;
classifying a pulse duration of the control data as high, medium high, medium low, or low; and
setting the attenuation level at one of four possible levels based upon the classification of the pulse duration and the determination whether the control data is fast or slow.

19. The method as defined in claim 18, wherein the step of setting the attenuation level includes the substeps of:
selecting a first one of the four possible attenuation levels when (1) the control data is slow, and (2) the pulse duration of the control data is classified as high;
selecting a second one of the four possible attenuation levels when (1) (a) the control data is slow and (b) the pulse duration of the control data is classified as medium high, or when (2) the control data is fast;
selecting a third one of the four possible attenuation levels when (1) the control data is slow, and (2) the pulse duration of the control data is classified as medium low; and
selecting a fourth one of the four possible attenuation levels when (1) the control data is slow, and (2) the pulse duration of the control data is classified as low.

20. A trainable transmitter for learning and transmitting an activation signal that includes an RF carrier frequency modulated with a code for remotely actuating a device, said trainable transmitter comprising:
a controller operable in a learning and an operating mode, said controller receiving the activation signal in said learning mode for storing data corresponding to the radio frequency and code of the activation signal, and, in said operating mode, providing an output signal, which identifies the radio frequency and code of the received activation signal, and an attenuation control signal;
a signal generator, coupled to said controller, for receiving said output signal and for outputting a modulated radio frequency carrier signal corresponding to the received activation signal;
an attenuator, coupled to said signal generator and to said controller, for receiving the attenuation control signal from said controller, for attenuating said modulated radio frequency carrier signal received from said signal generator at an attenuation level indicated by the attenuation control signal, and for transmitting an attenuated output signal to the device; and
means for generating reference signals having different frequencies, said reference signal generating means controlled by a frequency control signal, wherein, in said learning mode, said reference signal generating means outputs reference signals at different frequencies, which are input to said controller, the frequency of said output reference signal being varied until said controller detects that the frequency of said reference signal and the frequency of the received activation signal are substantially equal.

21. The transmitter as defined in claim 20, wherein said reference signal generating means includes a voltage controlled oscillator.

22. The transmitter as defined in claim 21, wherein said reference signal generating means further includes a mixer that mixes the received activation signal with the reference signal, and an output of said mixer is input to said controller to control the frequency of the reference signal output by said voltage controlled oscillator.

23. The transmitter as defined in claim 20, wherein said controller determines the attenuation level based upon signal characteristics of the received activation signal.

24. The transmitter as defined in claim 23, wherein said controller determines the attenuation level based upon the detected radio frequency carrier of the received activation signal.

25. The transmitter as defined in claim 23, wherein said controller determines the attenuation level based upon a detected pulse duration of control data provided in the received activation signal.

26. The transmitter as defined in claim 23, wherein said controller determines the attenuation level based upon both the detected radio frequency carrier of the received activation signal and a detected pulse duration of a control signal provided in the received activation signal.

* * * * *

UNITED STATES PATENT AND TRADEMARK OFFICE
CERTIFICATE OF CORRECTION

PATENT NO. : 5,442,340
DATED : August 15, 1995
INVENTOR(S) : Kurt A. Dykema

It is certified that error appears in the above-indentified patent and that said Letters Patent is hereby corrected as shown below:

Column 3, line 8;

"counsel" should be --console--.

Column 3, line 52;

"46" should be --42--.

Column 8, line 27;

"grater" should be --greater--.

Column 12, line 18;

After "level" delete --is--.

Column 14, line 38, claim 10;

"dan" should be --data--.

UNITED STATES PATENT AND TRADEMARK OFFICE
CERTIFICATE OF CORRECTION

PATENT NO. : 5,442,340
DATED : August 15, 1995
INVENTOR(S) : Kurt A. Dykema

It is certified that error appears in the above-indentified patent and that said Letters Patent is hereby corrected as shown below:

Column 14, line 45, claim 11;

"dan" should be --data--.

Signed and Sealed this

Seventh Day of May, 1996

Attest:

BRUCE LEHMAN

Attesting Officer

Commissioner of Patents and Trademarks